US010835963B2

(12) United States Patent
Huber et al.

(10) Patent No.: US 10,835,963 B2
(45) Date of Patent: Nov. 17, 2020

(54) ARRANGEMENT OF MACHINE TOOL AND CLAMPING HOLDER OF A WORKPIECE AND CHUCK FOR SAME

(71) Applicants: Martin Huber, Pfarrwefen (AT); Alfons Wörmer, Bischofshofen (AT)

(72) Inventors: Martin Huber, Pfarrwefen (AT); Alfons Wörmer, Bischofshofen (AT)

( * ) Notice: Subject to any disclaimer, the term of this patent is extended or adjusted under 35 U.S.C. 154(b) by 0 days.

(21) Appl. No.: 16/471,740

(22) PCT Filed: Jan. 5, 2018

(86) PCT No.: PCT/EP2018/050282
§ 371 (c)(1),
(2) Date: Jun. 20, 2019

(87) PCT Pub. No.: WO2018/130469
PCT Pub. Date: Jul. 19, 2018

(65) Prior Publication Data
US 2019/0329326 A1 Oct. 31, 2019

(30) Foreign Application Priority Data
Jan. 10, 2017 (EP) ..................................... 17150784

(51) Int. Cl.
*B23B 31/107* (2006.01)
*B23B 31/24* (2006.01)
*B23B 31/173* (2006.01)

(52) U.S. Cl.
CPC ............ *B23B 31/107* (2013.01); *B23B 31/24* (2013.01); *B23B 31/16158* (2013.01); *Y10T 279/17529* (2015.01)

(58) Field of Classification Search
CPC ............ B23B 31/107; B23B 31/16154; B23B 31/16158; B23B 31/16191; B23B 31/24; Y10T 279/17529
See application file for complete search history.

(56) References Cited

U.S. PATENT DOCUMENTS

| 801,788 A | 10/1905 | Hanson | |
| 1,603,531 A * | 10/1926 | Flaherty | ................ B23B 31/003 279/51 |

(Continued)

FOREIGN PATENT DOCUMENTS

| CN | 102632417 A | 8/2012 |
| CN | 202498383 U | 10/2012 |

(Continued)

*Primary Examiner* — Eric A. Gates
(74) *Attorney, Agent, or Firm* — Ann M. Knab; Thad McMurray

(57) ABSTRACT

The invention relates to an arrangement of a machine tool (10) and a workpiece holder (111) connected to a workpiece (14), wherein the workpiece holder (111) comprises at least one surface (111a) pointing radially towards the outside, in particular a substantially planar surface, which is configured for contact with a clamping element (109) of a multi-axis workpiece arm (11) which clamping element (109) is disposed in the radial direction between the workpiece holder (111) and a chuck (120), wherein the clamping element (109) is displaceable relative to the chuck (120) for clamping and releasing the workpiece holder (111), wherein the clamping element (109) is configured to vary a clamping force (F) exerted on the workpiece holder (111) when it is displaced relative to the chuck (120).

12 Claims, 1 Drawing Sheet

(56) References Cited

U.S. PATENT DOCUMENTS

| | | | | |
|---|---|---|---|---|
| 4,762,447 | A | * | 8/1988 | Marantette ............ B23B 31/205 <br> 279/4.04 |
| 5,284,348 | A | * | 2/1994 | Tanaka .................. B23B 31/202 <br> 279/43.7 |
| 5,575,488 | A | * | 11/1996 | Sholly, Jr. .............. B23Q 3/068 <br> 269/3 |
| 5,806,859 | A | * | 9/1998 | Saccomanno, III .. B23B 31/207 <br> 279/143 |
| 5,961,261 | A | | 10/1999 | Stark |
| 6,260,855 | B1 | * | 7/2001 | Curtis .................. B23B 31/268 <br> 279/51 |
| 2009/0051094 | A1 | | 2/2009 | Sandmeier |
| 2009/0079142 | A1 | | 3/2009 | Gross et al. |

FOREIGN PATENT DOCUMENTS

| | | | |
|---|---|---|---|
| CN | 202845828 U | | 4/2013 |
| CN | 105598727 A | | 5/2016 |
| GB | 920312 A | * 3/1963 | ....... B23B 31/16191 |
| JP | 2015174181 A | | 10/2015 |

\* cited by examiner

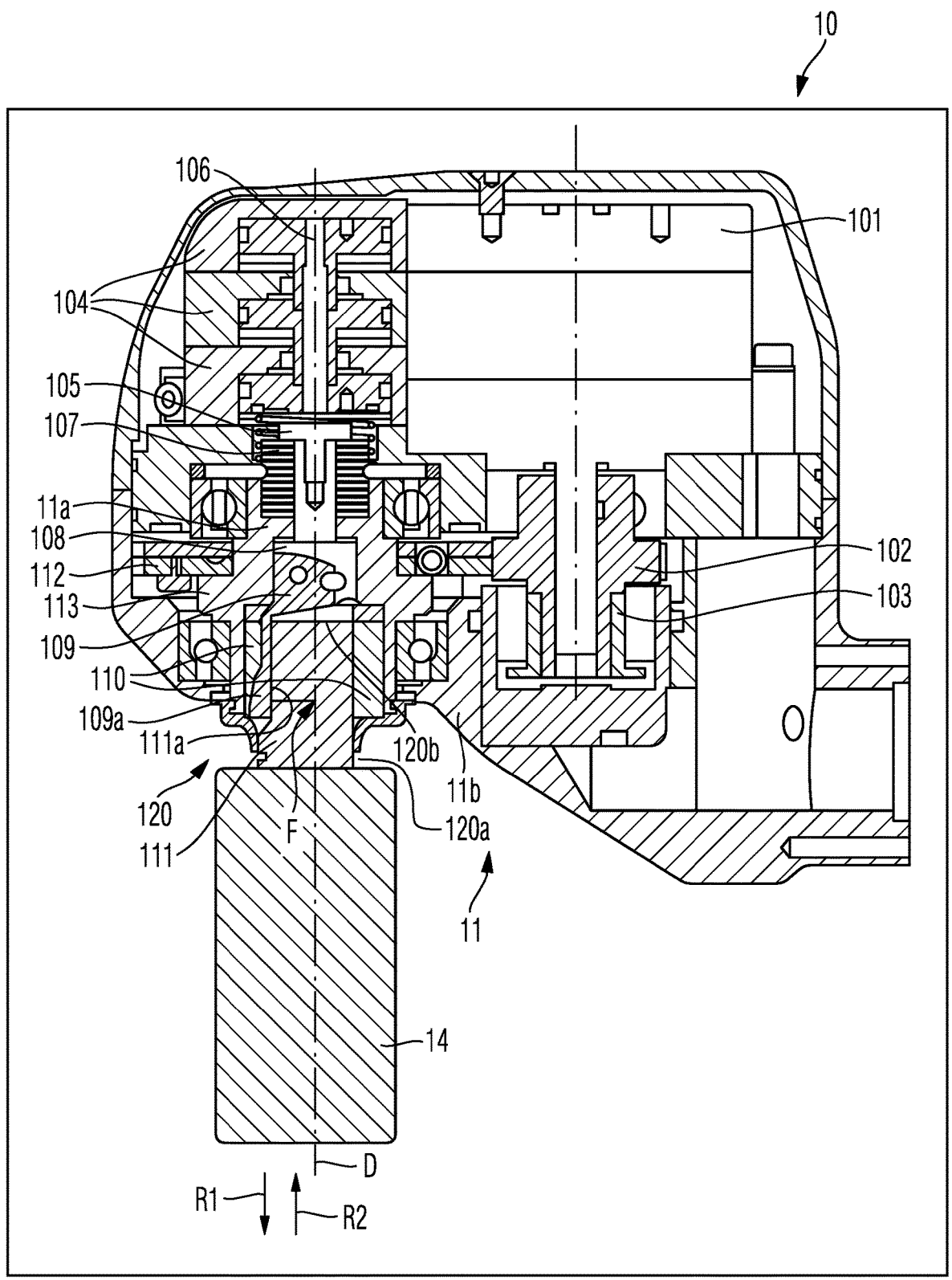

ARRANGEMENT OF MACHINE TOOL AND CLAMPING HOLDER OF A WORKPIECE AND CHUCK FOR SAME

CROSS-REFERENCE TO RELATED APPLICATIONS

This application is a National Stage application of International patent application No. PCT/EP2018/050282 filed on Jan. 5, 2018, which claims priority to European patent application No. 17150784.1 filed on Jan. 10, 2017, all the disclosures of which are incorporated herein by reference in their entirety.

FIELD OF THE INVENTION

The invention relates to an arrangement of a machine tool and a workpiece holder connected with a workpiece.

BACKGROUND

Usually, machine tools comprise a multi-axis workpiece arm configured with a chuck, wherein the chuck is configured such that the part to be fixed is clamped between a plurality of clamping jaws. As a rule, a screw is arranged in the interior of the chuck which pushes respective clamping jaws into a cone upon tightening of the screw and thus clamps the workpiece.

DE 1 259 177 B1 discloses a machine tool having a console guided vertically at the machine base and a device attached to the projecting end of the console to relieve the vertical guides from tilting moments of the console and to produce a force counteracting the weight of the console to facilitate adjustment of the console, wherein the force counteracting the weight of the console is the reset force of a spring, as is known with weight relief devices for consoles, which acts on the shorter lever arm of a two-armed lever pivotably mounted in the region of the intersection of the base surface of the machine base with the vertical guides, whose longer lever arm is hinged at a slide shoe which is guided slidably and lockably in horizontal guides at the console, wherein a locking device is configured as a clamping wedge adjustable by means of a hand wheel which is assigned a correspondingly configured stop surface at the horizontal guides.

SUMMARY

Thus, the invention is based on the task of providing an improved arrangement of a machine tool and a workpiece holder connected to a workpiece, said machine tool having compact dimensions, offering a secure hold and enabling fast opening and closing of a clamping device for clamping and releasing the workpiece holder.

The task is solved by an arrangement having the features of claim 1.

The present invention provides an arrangement of a machine tool and a workpiece holder connected to a workpiece, comprising a multi-axis workpiece arm of the machine tool having a chuck which is mounted to or in the multi-axis workpiece arm, in particular pivotably around an axis of rotation, with which chuck the workpiece holder of the workpiece is clampable, wherein the workpiece holder comprises at least one surface pointing radially towards the outside, in particular a substantially planar surface, which is configured for contact with a clamping element of the multi-axis workpiece arm which is disposed in the radial direction between the workpiece holder and the chuck, wherein the clamping element is displaceable relative to the chuck for clamping and releasing the workpiece holder, wherein the clamping element is configured to vary a clamping force exerted on the workpiece holder when it is displaced relative to the chuck.

It is an idea of the present invention to exert a clamping force on the workpiece holder or else to release this force therefrom in a constructionally simple manner by provision of the clamping element arranged displaceably relative to the chuck, such that a large clamping force is exertable on the workpiece holder due to the planar contact between chuck, clamping element and workpiece holder.

Advantageous embodiments and further developments may be taken from the subclaims as well as from the description with reference to the figures.

According to a further preferred further development it is provided that the clamping element and/or the chuck have a geometry such that the clamping element is configured to exert a clamping force on the workpiece holder when it is displaced relative to the chuck in a first direction and to reduce the clamping force exerted on the workpiece holder when it is displaced relative to the chuck in a second direction. In this way, the clamping force may be exerted on or reduced from the workpiece holder only by displacing the clamping element in combination with the geometrical configuration of clamping element and chuck.

According to a further preferred further development it is provided that the clamping element is displaceable in a direction parallel to a direction of extension of the surface or parallel to the axis of rotation for clamping the workpiece holder into the chuck and releasing the workpiece holder from the chuck. In this way, advantageously, the respective geometries of chuck and clamping element may be adjusted ideally to one another to clamp the workpiece holder reliably.

According to a further preferred further development, it is provided that the chuck is configured to be hollow, wherein an inner surface of the chuck and the clamping element are configured at least sectionally in a wedge-shaped manner in cross-section, wherein, when the clamping element is displaced relative to the chuck in the first direction, surfaces of the chuck and the clamping element arranged next to one another and configured in a wedge-shaped manner are in contact such that the clamping element clamps the workpiece holder in the chuck. Thus, the surfaces of the chuck and the clamping element each configured in a wedge-shaped manner complement each other such that they act on one another upon displacement of the clamping element to clamp the workpiece holder.

According to a further preferred further development it is provided that, when the clamping element is displaced relative to the chuck in the second direction, the surfaces of the chuck and the clamping element arranged next to one another and configured in a wedge-shaped manner may be moved out of contact such that the clamping element releases the workpiece holder from the chuck. Thus, the surfaces of the chuck and the clamping element each configured in a wedge-shaped manner complement each other such that they act on one another upon displacement of the clamping element to release the workpiece holder.

According to a further preferred further development it is provided that the first direction faces an open end of the chuck and the second direction faces a closed end of the chuck. This makes it possible for respective components effecting movement of the clamping element to be arrangeable advantageously in the interior of the multi-axis workpiece arm.

According to a further preferred further development it is provided that the clamping element is connected to or configured integrally with a clamping pin actuatable by means of a plate spring, wherein the chuck interacts with the clamping element in such a way that upon actuation of the plate spring the clamping pin moves the clamping element in the direction of a housing interior of the multi-axis workpiece arm, whereby clamping of the workpiece holder in a housing of the multi-axis workpiece arm is effectable. This enables secure fastening of the workpiece holder in the chuck, wherein the workpiece holder may not be released from the clamped state again advantageously without exertion of a force counteracting a spring force of the plate spring.

According to a further preferred further development it is provided that by actuating at least one piston of the multi-axis workpiece arm mounted in a cylinder box compressed air may be introduced against a spring assembly screw. This enables precisely controlled actuation of the clamping pin.

According to a further preferred further development it is provided that by introducing the compressed air against the spring assembly screw axial displacement of the clamping pin to release the workpiece holder clamped in the housing of the multi-axis workpiece arm is effectable. Thus, the workpiece holder may be released again reliably from the clamped state.

According to a further preferred further development it is provided that the clamping element is configured by a clamping tongue which rests against the chuck and the workpiece holder at least sectionally, and wherein the clamping element comprises a surface which is configured in a substantially planar fashion on a side facing the workpiece holder. This ensures advantageously planar contact of the clamping element both with the chuck and with the workpiece holder.

It is particularly favorable if the inventive multi-axis workpiece arm covers all motion axes of the machine tool, that is to say 5 axes in case of a 5-axis machine, such that the spindle with the tool may be realized in a fixed manner.

The described configurations and further developments may be combined with one another randomly.

Further possible configurations, further developments and implementations of the invention also comprise not explicitly mentioned combinations of features of the invention described previously or below in relation to the exemplary embodiments.

BRIEF DESCRIPTION OF THE DRAWING

The attached drawing is to provide more profound understanding of the embodiment of the invention. It illustrates the embodiment and serves to describe principles and concepts of the invention in conjunction with the description.

Other embodiments and many of the mentioned advantages may be taken with respect to the drawing. The illustrated elements of the drawing are not necessarily true to scale to one another.

FIG. 1 shows a cross-sectional view of an arrangement of a machine tool and a workpiece holder connected with a workpiece in accordance with a preferred embodiment of the invention.

DETAILED DESCRIPTION

The arrangement of the machine tool 10 and the workpiece holder 111 connected with the workpiece 14 comprises a multi-axis workpiece arm 11 of the machine tool 10 which comprises a chuck 120 which is mounted in the multi-axis workpiece arm 11. Alternatively, the chuck 120 may be mounted, for instance, to the multi-axis workpiece arm 11. The chuck is mounted pivotably around an axis of rotation D. The workpiece holder 111 may be clamped into the chuck 120. The workpiece holder 111 has a surface 111a pointing radially towards the outside. The surface 111a pointing radially towards the outside is configured as a planar surface.

The workpiece holder 111 is surrounded by an insert 110 of the chuck 120. The holder 111 rests thereon partially directly and partially indirectly.

The surface 111a pointing radially towards the outside is configured for contact with a clamping element 109 of the multi-axis workpiece arm 11 arranged between the workpiece holder 111 and the chuck 120 in the radial direction. The clamping element 109 is displaceable relative to the chuck 120 for clamping and releasing the workpiece holder 111, wherein the clamping element 109 is configured to vary a clamping force F exerted on the workpiece holder 111 upon displacement relative to the chuck 120.

Preferably, the clamping element 109 and the chuck 120 comprise a geometry such that the clamping element 109 is configured to exert a clamping force F on the workpiece holder 111 when it is displaced relative to the chuck 120 in a first direction R1 and to reduce the clamping force F exerted on the workpiece holder 111 when it is displaced relative to the chuck 120 in a second direction R2. Alternatively, for instance, the clamping element 109 or the chuck 120 may have a special geometry which enables clamping or else releasing the workpiece holder into or else from the chuck.

The clamping element 109 is arranged displaceably in a direction parallel to a direction of extension of the surface for clamping the workpiece holder 111 into the chuck 120 and releasing the workpiece holder 111 from the chuck 120. Alternatively, the clamping element 109 may be arranged displaceably, for instance, in a direction parallel to the axis of rotation D for clamping the workpiece holder 111 into the chuck 120 and releasing the workpiece holder 111 from the chuck 120.

The chuck 120 is configured to be hollow. An interior surface of the chuck 120 and the clamping element 109 are configured at least sectionally in a wedge-shaped manner in cross-section. When the clamping element 109 is displaced relative to the chuck 120 into the first direction R1, surfaces of the chuck 120 and the clamping element 109 arranged next to one another and configured in a wedge-shaped manner are in contact such that the clamping element 109 clamps the workpiece holder 111 in the chuck 120. When the clamping element 109 is displaced relative to the chuck 120 into the second direction R2, surfaces of the chuck 120 and the clamping element 109 arranged next to one another and configured in a wedge-shaped manner are movable out of contact such that the clamping element 109 releases the workpiece holder 111 from the chuck 120.

The first direction R1 preferably faces an open end 120a of the chuck 120 and the second direction R2 a closed end 120b of the chuck 120. Alternatively, an opposite orientation may be realized for instance.

The clamping element 109 is preferably connected fixedly to a clamping pin 108 actuatable by means of a plate spring. Alternatively, the clamping element 109 may be configured integrally for instance with the clamping pin actuatable by means of the plate spring. The chuck 120 interacts with the clamping element 109 in such a way that upon actuation of the plate spring 107 the clamping pin 108 moves the clamping element 109 in the direction of a housing interior 11a of the multi-axis workpiece arm 11, whereby clamping of the workpiece holder 111 in a housing 11b of the multi-axis workpiece arm 11 is effectable.

By actuation of at least one piston 106 of the multi-axis workpiece arm 11 mounted in a cylinder box 104 compressed air may be introduced against a spring assembly screw 105. By introducing the compressed air against the spring assembly screw 105 axial displacement of the clamping pin 108 to release the workpiece holder 111 clamped in the housing 11b of the multi-axis workpiece arm 11 is effectable.

The clamping element 109 is preferably configured by a clamping tongue 109a. The clamping tongue 109a is arranged at least sectionally in contact with the chuck 120 and the workpiece holder 111. The clamping element 109 comprises a surface configured in a substantially planar fashion on a side facing the workpiece holder 111. The clamping tongue 109a and the insert 110 comprise wedge-shaped surfaces facing one another. Here, the wedge angle amounts to approximately 10 degrees but may be reduced to, for instance, 5 degrees to increase the clamping effect.

An electric motor 101 arranged in the housing of the multi-axis workpiece arm 11 drives a spur gear 102 which transmits a produced moment to a shaft 113 via a further spur gear 112. This causes a rotary motion of the workpiece holder 111. The rotary motion of the spur gear 102 is detected by a rotary encoder 103 whose output signal is used as a control variable for the rotary motion.

Although the present invention has been described above in conjunction with preferred exemplary embodiments, it is not limited thereto but modifiable in a number of ways. In particular, the invention may be changed or modified in different ways without leaving the scope of the invention.

For instance, the holder 111 may have a rectangular or square cross-section. However, a non-rotationally symmetric polyhedral cross-section is preferred, wherein a planar side surface 111a and the surface opposite thereto extend preferably over a maximum extension of the holder 111 in the direction of the respective surface such that a comparatively small surface pressure is provided.

However, in an alternative configuration, the surfaces may be spherical or rounded at least partially, wherein then the surfaces of the clamping tongue and the insert 110 in contact therewith are profiled in a way matching one another.

For instance, a dimensioning or else geometrical configuration of the chuck, the clamping element and/or the workpiece holder may be adapted to respective constructional requirements of the workpiece changing arm.

The invention claimed is:

1. An arrangement of a machine tool (10) and a workpiece holder (111) connected to a workpiece (14), comprising
a multi-axis workpiece arm (11) of the machine tool (10) having a chuck (120) which is mounted to or in the multi-axis workpiece arm (11), with which chuck (120) the workpiece holder (111) of the workpiece (14) is clampable,
wherein the workpiece holder (111) comprises at least one surface (111a) pointing radially towards the outside, which is configured for contact with a clamping element (109) of the multi-axis workpiece arm (11), which clamping element (109) is disposed in the radial direction between the workpiece holder (111) and the chuck (120),
wherein the clamping element (109) is displaceable relative to the chuck (120), for clamping and releasing the workpiece holder (111),
wherein the clamping element (109) is configured to vary a clamping force (F) exerted on the workpiece holder (111) when it is displaced relative to the chuck (120), and
wherein the at least one surface (111a) is a substantially planar surface.

2. The arrangement as claimed in claim 1,
wherein the clamping element (109) and/or the chuck (120) have a geometry such that the clamping element (109) is configured to exert a clamping force (F) on the workpiece holder (111) when it is displaced relative to the chuck (120) in a first direction (R1) and to reduce the clamping force (F) exerted on the workpiece holder (111) when it is displaced relative to the chuck (120) in a second direction (R2).

3. The arrangement as claimed in claim 2,
wherein the chuck (120) is configured to be hollow,
wherein an inner surface of the chuck (120) and the clamping element (109) are configured at least sectionally in a wedge-shaped manner in cross-section,
wherein, when the clamping element (109) is displaced relative to the chuck (120) in the first direction (R1), surfaces of the chuck (120) and the clamping element (109) arranged next to one another and configured in a wedge-shaped manner are in contact such that the clamping element (109) clamps the workpiece holder (111) in the chuck (120).

4. The arrangement as claimed in claim 3,
wherein when the clamping element (109) is displaced relative to the chuck (120) in the second direction (R2), the surfaces of the chuck (120) and the clamping element (109) arranged next to one another and configured in a wedge-shaped manner may be moved out of contact such that the clamping element (109) releases the workpiece holder (111) from the chuck (120).

5. The arrangement as claimed in claim 2,
wherein the first direction (R1) faces an open end (120a) of the chuck (120) and the second direction (R2) faces a closed end (120b) of the chuck (120).

6. The arrangement as claimed in claim 1,
wherein the clamping element (109) is displaceable in a direction parallel to a direction of extension of a surface or parallel to an axis of rotation (D) for clamping the workpiece holder (111) into the chuck (120) and releasing the workpiece holder (111) from the chuck (120).

7. The arrangement as claimed in claim 1,
wherein the clamping element (109) is connected to or configured integrally with a clamping pin (108) actuatable by means of a plate spring (107),
wherein the chuck (120) interacts with the clamping element (109) in such a way that upon actuation of the plate spring (107) the clamping pin (108) moves the clamping element (109) in the direction of a housing interior (11a) of the multi-axis workpiece arm (11), whereby clamping of the workpiece holder (111) in a housing (11b) of the multi-axis workpiece arm (11) is effectable.

8. The arrangement as claimed in claim 1,
wherein by actuating at least one piston (106) of the multi-axis workpiece arm (11) mounted in a cylinder box (104) compressed air may be introduced against a spring assembly screw (105).

9. The arrangement as claimed in claim 8,
wherein by introducing the compressed air against the spring assembly screw (105) axial displacement of the clamping pin (108) to release the workpiece holder (111) clamped in the housing (11*b*) of the multi-axis workpiece arm (11) is effectable.

10. The arrangement as claimed in claim 1,
wherein the clamping element (109) is configured by a clamping tongue (109*a*) which rests against the chuck (120) and the workpiece holder (111) at least sectionally, and
wherein the clamping element (109) comprises a surface which is configured in a substantially planar fashion on a side facing the workpiece holder (111).

11. The arrangement as claimed in claim 10,
wherein surfaces of the chuck (120) and the clamping element (109) arranged next to one another and configured in a wedge-shaped manner interact with one another, and upon displacement of the relative position thereof in one direction clamp the holder (111) in the chuck (120) and upon displacement in the other direction release the connection therebetween.

12. The arrangement as claimed in claim 1,
wherein the chuck (120) is pivotable around an axis of rotation (D),
wherein the clamping element (109) is displaceable relative to the chuck (120) in the axial direction.

\* \* \* \* \*